July 5, 1966 L. R. HAASE 3,259,153
ICE, SNOW AND PICNIC KIT
Filed June 6, 1963 2 Sheets-Sheet 1

INVENTOR.
Louis R. Haase
BY
Cushman, Darby & Cushman
ATTORNEYS

July 5, 1966    L. R. HAASE    3,259,153
ICE, SNOW AND PICNIC KIT
Filed June 6, 1963    2 Sheets-Sheet 2

INVENTOR.
Louis R. Haase
BY
Cushman, Darby & Cushman
ATTORNEYS

United States Patent Office 3,259,153
Patented July 5, 1966

3,259,153
ICE, SNOW AND PICNIC KIT
Louis R. Haase, 5743 1st Ave., Baltimore, Md.
Filed June 6, 1963, Ser. No. 285,946
8 Claims. (Cl. 141—110)

This invention relates to new and useful containers and in particular to receptacles for storing and carrying food, sand or any other product or article.

More particularly, the present invention proposes the construction of improved containers which can be used to store and transport food conveniently and compactly and substantially in the same condition as that at the time it was prepared or sand during the winter season to be used to free vehicles stuck in the snow and/or ice. Heretofore, containers employed especially for the transportation of sand in an automobile during the winter season have several disadvantages. For one thing, the construction of such containers is such that they tend to shift around in the trunk of an automobile in motion or topple over in the event of sudden stopping or starting operations. Generally too, the only available container is a common cardboard box. The top of the box serving as a lid, usually fails to contain efficiently the sand within the container thus causing excess spillage of sand on the floor of the trunk. The use of this type container also generally necessitates the provision of a separate implement to dispense the sand, for instance, a hand shovel.

It is therefore a principal object of the instant invention to provide a container which would obviate the disadvantages heretofore experienced with containers described above. It is another object of the invention to provide a container which exhibits advantageous stability in a moving vehicle. It is yet another object to provide a container which has a tight fitting lid which prevents spillage of the container's contents. It is a further object to provide a container with a lid which is conveniently used to dispense the container's contents. Other objects and advantages of the invention will be apparent in the following detailed description and the accompanying drawings which illustrate preferred embodiments of the invention, wherein:

Figure 1:
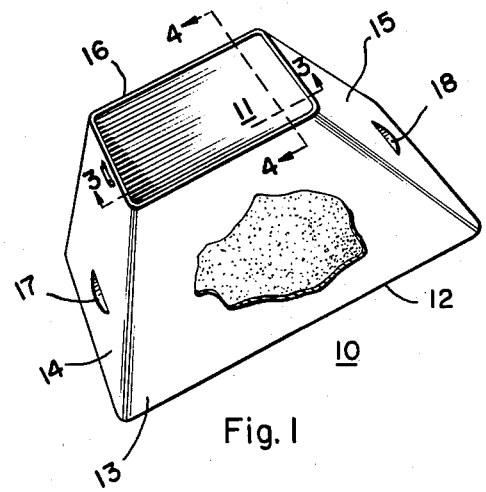
FIGURE 1 is a perspective view of the rigid container constructed and arranged in accordance with the present invention.

Referring now to the drawings, the receptacle 10 has an open top 11 and closed bottom 12 and sides 13, 14, 15 and 16. The four sides are tapered or sloped so that the bottom 12 is greater in area than the top 11 and sides 13 and 16 are wider at the top and bottom than sides 14 and 15. Sides 14 and 15 are provided with finger-receiving means 17 and 18 which may be conventional handles or a recess projecting into or out of said walls.

Figure 2:
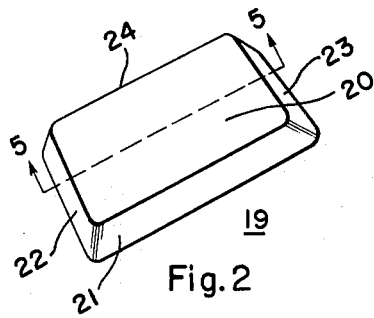
FIGURE 2 is a perspective view of a lid suitable for use in combination with the receptacle shown in FIGURE 1.
Figures 3, 4:
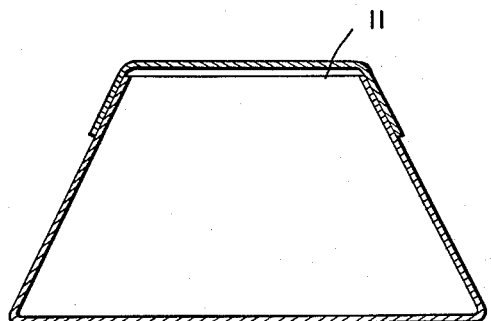
FIGURE 3 is a front vertical sectional view of the structure shown in FIGURE 1 taken along the line 3—3.
FIGURE 4 is a side vertical sectional view of the structure shown in FIGURE 1 taken along the line 4—4.
Figure 5:
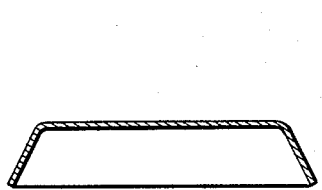
FIGURE 5 is a front vertical sectional view of the lid structure shown in FIGURE 2 taken along the line 5—5.
Figure 6:
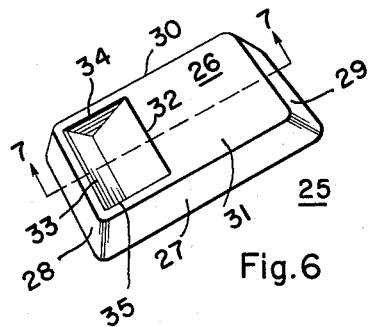
FIGURE 6 is a perspective view of a modification of a lid structure suitable for use in combination with the receptacle shown in FIGURE 1.
Figure 7:
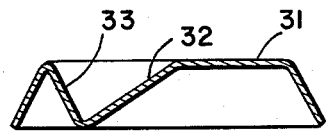
FIGURE 7 is a front vertical sectional view of the lid structure shown in FIGURE 6 taken along the line 7—7.

Receptacle 10 is provided with a tight-fitting lid 19 having a top 20 and sides 21, 22, 23 and 24. The four sides are tapered or sloped to engage sides 13, 14, 15 and 16, respectively, of container 10. A modification of the lid illustrated in FIGURE 2 is the lid structure shown in FIGURE 6. The lid 25 is provided with a top 26 and sides 27, 28, 29 and 30. The four sides are tapered or sloped to engage sides 13, 14, 15 and 16, respectively, of container 10. The lid top 26 is provided with a horizontally disposed section 31 provided adjacent one of its ends with a concave recess comprising downwardly sloping walls 32 and 33 facing the sides 28 and 29, respectively, with vertically disposed walls 34 and 35 facing the sides 27 and 30, respectively. The longitudinal center line of the recess coincides with the longitudinal center line of the receptacle to permit easy transverse insertion therein thus facilitating dispensing of the receptacle's contents.

Figure 8:
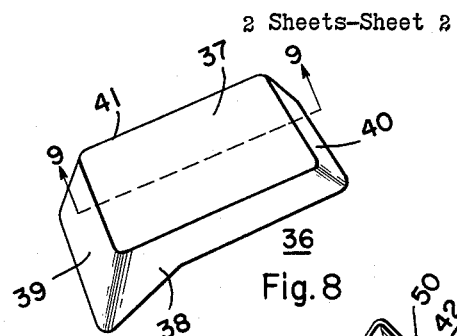
FIGURE 8 is a perspective view of another modification of a lid structure suitable for use in combination with the receptacle shown in FIGURE 1.
Figure 9:
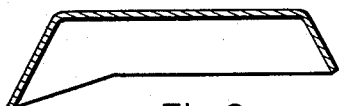
FIGURE 9 is a front vertical sectional view of the lid structure shown in FIGURE 8 taken along the line 9—9.
Figure 11:
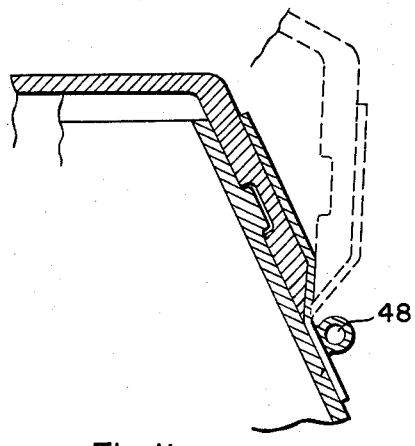
FIGURE 11 is a fragmentary vertical sectional view of the structure shown in FIGURE 10.

A further modification of the lid illustrated in FIGURE 2 is the lid structure shown in FIGURE 8. The lid 36 is provided with a flat top 37 and sides 38, 39, 40 and 41. The four sides are tapered or sloped to engage sides 13, 14, 15 and 16, respectively, of container 10. The lid 36 is provided with a recess formed by side 39 whose perpendicular height is greater than corresponding side 40 and angularly downwardly disposed portions of sides 38 and 41. The lid, again, is utilized in combination with the novel low-center of gravity container 10, by inserting it in a manner such that the longitudinal center line of the lid transverses the longitudinal center line of the container.

Figure 10:
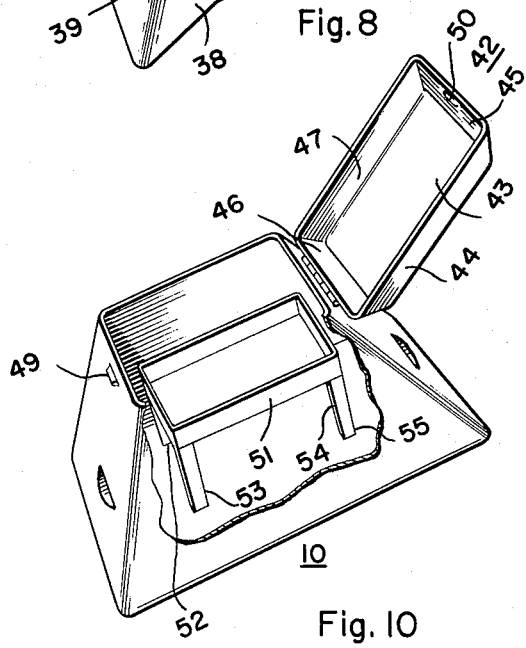
FIGURE 10 is a perspective view, partly in section to show the inner construction of the rigid container of FIGURE 1 used as a container for the storage and transportation of food.

A still further embodiment of the invention is illustrated in FIGURE 10 which shows a container, substantially as shown in FIGURE 1, modified to the extent that lid 42 is provided with top 43 and sides 44, 45, 46 and 47 which are tapered or sloped to engage sides 13, 14, 15 and 16, respectively, of container 10, and is hingedly secured to container 10 at 48 by means attached to side 15. The lid is retainingly secured by a male member 49 on side 14 of the receptacle 10 which engages aperture 50 provided on side 45 of lid 42. Container 10 may conveniently be supplied with storage tray 51 which may be provided with legs 52, 53, 54 and 55.

Figure 12:
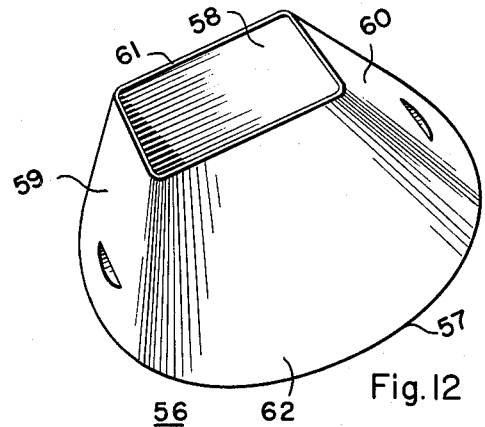
FIGURE 12 is a perspective view similar to FIGURE 1 but illustrating still another modification of the present invention.

Yet another embodiment of the invention is shown in FIGURE 12 which shows a container having a round or elliptically shaped closed bottom 57 with a rectangularly shaped open top 58, the bottom being greater in area than the top to provide a low-center of gravity container and the top being constructed with four tapered or sloped walls 59, 60, 61 and 62 whose lower edges are curvedly extended to form the side wall of the container 56. Thus, according to this embodiment, any of the aforedescribed lids may be used in combination with the container as shown in FIGURE 12.

While I have illustrated and described the preferred embodiments of my invention, it is to be understood that I do not limit myself to the precise construction herein disclosed and the right is reserved to all changes and modifications coming within the scope of the invention as defined in the appended claims.

What is claimed is:

1. A container comprising a rectangular receptacle having an open top and closed bottom, the four sides of said receptacle being tapered so that said bottom is greater in area than said top, two of said sides substantially parallel to the longitudinal axis of said receptacle being wider at the top and bottom than the two other sides, said open top provided with dispensing means comprising a lid having a top and four sides, said four sides being tapered to engage said tapered sides of said rectangular receptacle, said lid top provided wtih a concave recess comprising a pair of downwardly sloping walls and a pair of vertically disposed walls parallel to the longitudinal axis of said rectangular receptacle, said recess adjacent the end of said lid top.

2. A container comprising a rectangular receptacle having an open top and closed bottom, the four sides of said receptacle being tapered so that said bottom is greater in area than said top, two of said four sides substantially perpendicular to the longitudinal axis of said receptacle being narrower at the top and bottom than the two other sides and being provided with finger-receiving means, said open top provided with dispensing means comprising a lid having a top and four sides, said four sides being tapered to engage said tapered sides of said rectangular receptacle, said lid providing a recess comprising the lid top in combination with a first lid side substantially perpendicular to the longitudinal axis of said receptacle and extended to a length greater than a parallel second lid side and a third and fourth lid side connecting said first and second lid sides each having an angularly downwardly disposed portion adjacent said first lid side.

3. A container comprising a receptacle formed of a rectangular flat bottom wall, a pair of side walls tapering inwardly and upwardly from said bottom wall and a pair of end walls tapering inwardly and upwardly from said bottom wall, said end walls being united to said side walls the upper edges of said end walls and said side walls forming an open top, said open top provided with a lid having a flat top wall, a pair of side walls tapering outwardly and downwardly from said top wall and a pair of end walls tapering outwardly and downwardly from said top wall, said lid side walls and end walls engageable with said receptacle side walls and end walls, respectively.

4. The container of claim 3 wherein said lid is hingedly attached to one of said receptacle end walls.

5. The container of claim 4 including cooperative locking means on the lid end wall and the receptacle end wall remote from the point of attachment of said lid to said receptacle.

6. The container of claim 5 wherein the cooperative locking means consists of a male member provided on said receptacle end wall and engageable with an aperture provided on said lid end wall.

7. A container comprising a rectangular receptacle having an open top and closed bottom, the four sides of said receptacle being tapered so that said bottom is greater in area than said top, two of said sides substantially parallel to the longitudinal axis of said receptacle being wider at the top and bottom than the two other sides, said open top provided with a lid hingedly attached to one of said other sides and having four sides, said four sides being tapered to engage said tapered sides of said rectangular receptacle.

8. The container of claim 7 including a removable storage tray.

References Cited by the Examiner

UNITED STATES PATENTS

| | | | |
|---|---|---|---|
| 1,399,168 | 12/1921 | Towle | 220—1 |
| 1,597,757 | 8/1926 | Berger | 229—22 |
| 1,916,859 | 5/1930 | Heller | 220—85 |

FOREIGN PATENTS

| | | |
|---|---|---|
| 120,866 | 2/1948 | Sweden. |

LAVERNE D. GEIGER, *Primary Examiner.*

H. BELL, *Assistant Examiner.*